(12) United States Patent
Drake

(10) Patent No.: US 6,989,206 B2
(45) Date of Patent: Jan. 24, 2006

(54) WATER RECYCLING IN FUEL CELL SYSTEMS

(75) Inventor: Javit A. Drake, Mountain View, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 402 days.

(21) Appl. No.: 10/293,995

(22) Filed: Nov. 13, 2002

(65) Prior Publication Data

US 2004/0091763 A1    May 13, 2004

(51) Int. Cl.
*H01M 8/02* (2006.01)
*H01M 8/08* (2006.01)

(52) U.S. Cl. .............................. 429/12; 429/17; 429/34
(58) Field of Classification Search ................ 429/12, 429/17, 34
See application file for complete search history.

(56) References Cited

U.S. PATENT DOCUMENTS

| 5,030,356 | A |  | 7/1991 | Blume et al. |  |
|---|---|---|---|---|---|
| 5,266,206 | A |  | 11/1993 | Baker et al. |  |
| 5,976,346 | A |  | 11/1999 | Freire et al. |  |
| 6,207,306 | B1 |  | 3/2001 | Sederquist |  |
| 6,303,244 | B1 | * | 10/2001 | Surampudi et al. | ........... 429/17 |
| 6,403,248 | B1 |  | 6/2002 | Eshraghi |  |
| 6,686,081 | B2 | * | 2/2004 | Gottesfeld | ................... 429/30 |
| 2001/0045364 | A1 |  | 11/2001 | Hockaday et al. |  |
| 2002/0076589 | A1 | * | 6/2002 | Bostaph et al. | ............... 429/22 |
| 2002/0119353 | A1 | * | 8/2002 | Edlund et al. | ................ 429/19 |

FOREIGN PATENT DOCUMENTS

| WO | WO 02/07241 | 1/2002 |
|---|---|---|
| WO | WO 02/071522 | 9/2002 |

* cited by examiner

*Primary Examiner*—Gregg Cantelmo

(57) ABSTRACT

Systems and methods of recycling water from the cathode based on passive water transport mechanisms are described. These systems and methods allow water to be recycled in a fuel cell without moving components and without using power. In addition, these systems and methods allow a water recycling system to be implemented in a fuel cell system with a relatively small form factor, such as a portable fuel cell system. In one aspect, a fuel cell system includes a fuel cell and a mixing chamber. The fuel cell has an anode side and a cathode side. The mixing chamber has a recycled water input port that is coupled to the cathode side of the fuel cell, a fuel input port, and a hydrated fuel output port that is coupled to the anode side of the fuel cell. A selectively permeable membrane is disposed upstream of an input port of the mixing chamber and is operable to selectively permit osmotic inflow of a first mixing component into the mixing chamber and to substantially prevent outflow of a second mixing component from the mixing chamber.

16 Claims, 2 Drawing Sheets

WATER RECYCLING IN FUEL CELL SYSTEMS

BACKGROUND

Electrochemical fuel cells convert a fuel (e.g., substantially pure hydrogen, methanol reformate or natural gas reformate, or a methanol-containing stream) and an oxidant (e.g., substantially pure oxygen, oxygen-containing air, or oxygen in a carrier gas) to electricity and reaction product. Two or more fuel cells may be connected electrically in series to increase the overall power output of a fuel cell system. Such a multiple fuel cell arrangement is referred to as a fuel cell stack. The stack typically includes inlet ports and manifolds for directing the fuel stream and the oxidant stream to the individual fuel cell reactant flow passages. The stack also may include an inlet port and a manifold for directing a coolant fluid (e.g., water) stream to interior passages within the stack to absorb heat generated by the fuel cell during operation.

Solid polymer electrochemical fuel cells generally employ a membrane electrode assembly that includes an ion exchange membrane or solid polymer electrolyte disposed between two electrodes. The electrodes typically are formed from a layer of porous, electrically conductive sheet material, such as carbon fiber paper or carbon cloth. The membrane electrode assembly contains a catalyst (e.g., platinum powder) at each membrane/electrode interface to induce a selected electrochemical reaction. In operation, the electrodes are connected electrically by an external electric circuit. The fuel moves through the porous anode substrate and is oxidized at the anode electrocatalyst layer. The oxidant, on the other hand, moves through the porous cathode substrate and is reduced at the cathode electrocatalyst layer to form a reaction product. In hydrogen based proton exchange membrane fuel cell systems, the electrocatalyzed reaction at the anode produces protons and electrons. In direct methanol fuel cells, methanol and water react to form carbon dioxide, protons, and electrons. The ion exchange membrane enables the flow of protons from the anode to the cathode. The membrane substantially separates the fuel stream from the oxidant stream. At the cathode electrocatalyst layer, oxidant reacts with the protons that have crossed the membrane barrier to form water as the reaction product. Product water formed at the cathode electrode may be removed by evaporation or entrainment into a circulating gaseous stream of oxidant, or by capillary action into and through a porous fluid transport layer adjacent to the cathode.

Water management has become crucial in the development of fuel cells, including direct alcohol fuel cells. Water may serve one or more functions within a fuel cell, including hydrating the electrolyte (e.g., a solid polymer electrolyte), diluting the fuel (e.g., to reduce fuel crossover), and serving as a reactant (e.g., methanol electro-oxidation). In a direct methanol fuel cell, for example, the anode requires water as a reactant and a fuel diluent; water collects at the cathode from diffusion and from electro-osmotic drag through the membrane. In an effort to decrease the overall volume and weight of a fuel cell system, it is advantageous to recycle water from the cathode. For cells with a sulfonic acid polymer electrolyte, an aqueous solution with less than 7% methanol by weight typically is needed at the anode for optimal efficiency. Thus, once such a fuel cell is started, using recycled water may eliminate 93% or more of the fuel storage weight.

Water recycling schemes for fuel cell systems have been proposed (see, e.g., U.S. Pat. No. 6,303,244 and International Publication No. WO 02/07241). In general, these approaches involve the use of pumps to transfer product water from the cathode to the anode.

SUMMARY

The invention features systems and methods of recycling water from the cathode based on passive water transport mechanisms. In this way, the invention allows water to be recycled in a fuel cell without moving components and without using power. In addition, the invention allows a water recycling system to be implemented in a fuel cell system with a relatively small form factor, such as a portable fuel cell system.

In one aspect, the invention features a fuel cell system that includes a fuel cell and a mixing chamber. The fuel cell has an anode side and a cathode side. The mixing chamber has a recycled water input port that is coupled to the cathode side of the fuel cell, a fuel input port, and a hydrated fuel output port that is coupled to the anode side of the fuel cell. A selectively permeable membrane is disposed upstream of an input port of the mixing chamber and is operable to selectively permit osmotic inflow of a first mixing component into the mixing chamber and to substantially prevent outflow of a second mixing component from the mixing chamber.

In another aspect, the invention features a fuel cell method. In accordance with this inventive method, hydrogen ions are produced electro-catalytically from a hydrated fuel at an anode. The hydrogen ions and water are transported from the anode to a cathode. Water recovered from the cathode is passively transported to a mixing chamber while substantially preventing outflow of a fuel from the mixing chamber to the cathode. Fuel from a fuel source is transported to the mixing chamber. Hydrated fuel is delivered from the mixing chamber to the anode.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
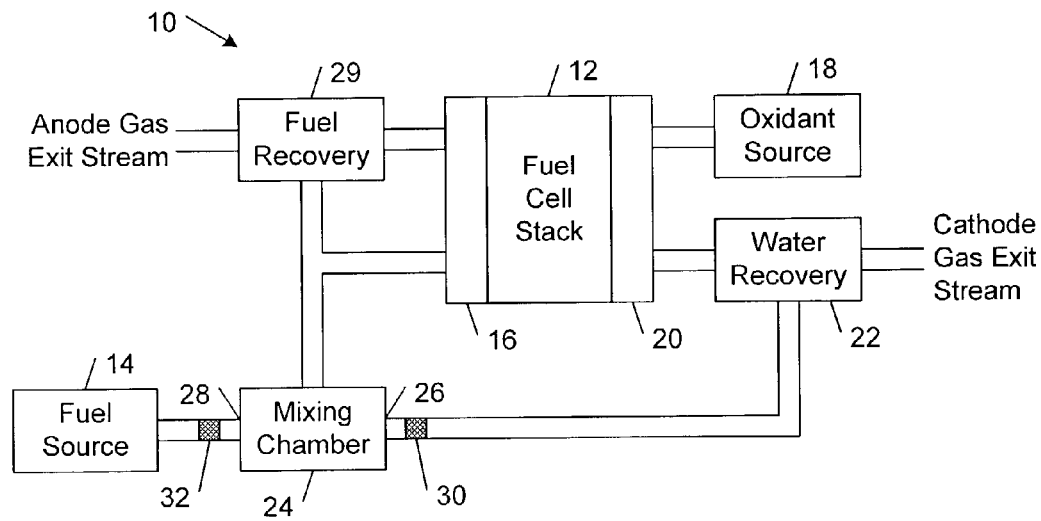
FIG. 1 is a block diagram of a fuel cell system, including a fuel cell stack, a selectively permeable membrane coupled between a mixing chamber and a water recovery mechanism, and a selectively permeable membrane coupled between the mixing chamber and a fuel source.

Referring to FIG. 1, in one embodiment, a fuel cell system 10 includes a fuel cell stack 12, a fuel source 14 coupled to an anode side 16 of fuel cell stack 12, and an oxidant source 18 coupled to a cathode side 20 of the fuel cell stack 12. A water recovery mechanism 22 separates and collects water from the cathodic exit stream (e.g., substantially unused oxidant), and feeds water from the cathode side 20 of fuel cell stack 12 to a mixing chamber 24, where fuel is hydrated before being delivered to the anode side 16 of fuel cell stack 12. Mixing chamber 24 includes a water input port 26 and a fuel input port 28. A fuel recovery mechanism 29 recycles hydrated fuel from the anode side 16 of fuel cell stack 12 and discharges anode gas products (e.g., carbon dioxide).

In the illustrated embodiment, a selectively permeable membrane 30 is disposed upstream of the water input port 26. Membrane 30 is permeable to water and substantially impermeable to fuel. Selectively permeable membrane 30 allows water to enter mixing chamber 24, while substantially preventing outflow of fuel to the cathode side 20 of fuel cell stack 12. In this way, selectively permeable membrane 30 prevents fuel from mixing with oxidant at the cathode side 20 of fuel cell stack 12, thereby preventing corruption of the oxidant and reduced performance of the cathode. A selectively permeable membrane 32 is disposed upstream of the fuel input port. Membrane 32 is permeable to fuel and substantially impermeable to water. In this way, selectively permeable membrane 32 prevents the outflow of water from the mixing chamber into fuel source 14. The thicknesses and cross-sectional areas of selectively permeable membranes 30, 32 are selected to achieve a target mixing ratio of fuel and recycled water (e.g., a fuel-to-water mixing ratio in the range of about 0.5%:99.5% to about 4%:96% in a direct methanol fuel cell embodiment). To achieve target flow rates of recycled water and fuel, some embodiments may include multiple channels to supply recovered water from cathode side 20 of fuel cell stack 12 into mixing chamber 24 and multiple channels to supply fuel from fuel source 14 into mixing chamber 24. In some embodiments, one or both of selectively permeable membranes 30, 32 may be disposed in respective channels with larger or smaller cross-sectional areas than the supply tubes from cathode side 16 of fuel cell stack 12 and fuel source 14 in order to achieve specified areas for the membrane surfaces that are exposed to the water and fuel streams, respectively.

Selectively permeable membrane 30 may be any known membrane that is permeable to water and substantially impermeable to fuel. Exemplary materials for selectively permeable membrane 30 for a direct methanol fuel cell include a hydrophilic material (e.g., mordenite), cellophane, and a perfluorosulfonic acid polymer (e.g., Nafion®, which is available from E.I. du Pont de Nemours and Company of Wilmington, Del., U.S.A.). Selectively permeable membrane 30 may take the form of a homogeneous membrane, an asymmetric membrane, a multilayer composite membrane, a matrix incorporating a gel or liquid layer, or any other membrane form known in the art.

Selectively permeable membrane 32 may be any known membrane that is permeable to fuel and substantially impermeable to water. Exemplary materials for selectively permeable membrane 32 for a direct methanol fuel cell include hydrophobic materials (e.g., polyolefins such as polyethylene, poly(1-butene), poly(4-methyl pentene), polypropylene, bis-1,4-polybutadiene, natural rubber, cross-linked polybutadiene, cis-polyisoprene, polysilicone(dimethyl silicone), copolymers of silicone, and silicone carbonates, cellulose-tridecanoate and the like), and rubbery polymers (e.g., rubbery non-crystalline polymers with glass transition temperatures below the normal operating temperature of fuel cell system 12, thermoplastic elastomers, nitrile rubber, neoprene, polydimethylsiloxane (silicone rubber), chlorosulfonated polyethylene, polysilicone-carbonate copolymers, fluororelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, polyesteramides, and block copolymers of polyethers and polyesters). Selectively permeable membrane 32 may take the form of a homogeneous membrane, an asymmetric membrane, a multilayer composite membrane, a matrix incorporating a gel or liquid layer, or any other membrane form known in the art.

In some embodiments, fuel cell stack 12 includes a plurality of individual fuel cells that may be implemented using any one of a wide variety of different fuel cell technologies, including high-temperature solid oxide fuel cell technology and low-temperature solid polymer fuel cell technology. The fuel cells may use liquid or gas reactants. For liquid fuel based fuel cells, the recycled water may serve as a diluent. In these systems, osmosis through selectively permeable membrane 30 accomplishes the dilution. For feed gas based fuel cells, product water at cathode side 20 of fuel cell stack 12 may be used for humidification. In these systems, diffusion from the wet cathode side 20 to dry feed gas provides the water transport. In one embodiment, the individual fuel cells in stack 12 are implemented as direct methanol fuel cells each of which includes a membrane electrode assembly that is formed from a thin, proton transmissive solid polymer membrane-electrolyte, or ion exchange membrane (e.g., a Nafion® membrane, which is available from E.I. du Pont de Nemours and Co. of Wilmington, Del., U.S.A.), that is disposed between an anode layer and a cathode layer. The membrane electrode assembly preferably is sandwiched between a pair of electrically conductive anode and cathode current collectors, and preferably contains channels (or openings) for distributing over the anode and the cathode the hydrated methanol and forced or passive air respectively received from mixing chamber 24 and oxidant source 18.

Water recovery mechanism 22 may be any known mechanism for recovering water from the cathode side 20 of fuel cell stack 12, including an active water recovery mechanism (e.g., a condenser) and a passive water recovery mechanism (e.g., a membrane that is selectively permeable to the cathode gas products and impermeable to water, or a water wicking or soaking layer with water permeable hollow fibers). Fuel recovery mechanism 29 may be any known mechanism for recovering hydrated fuel from the anode side 16 of fuel cell stack 12, including a membrane that is selectively permeable to anode gas products and impermeable to the hydrated fuel received from the anode side 16 of fuel cell stack 12.

Figure 2:
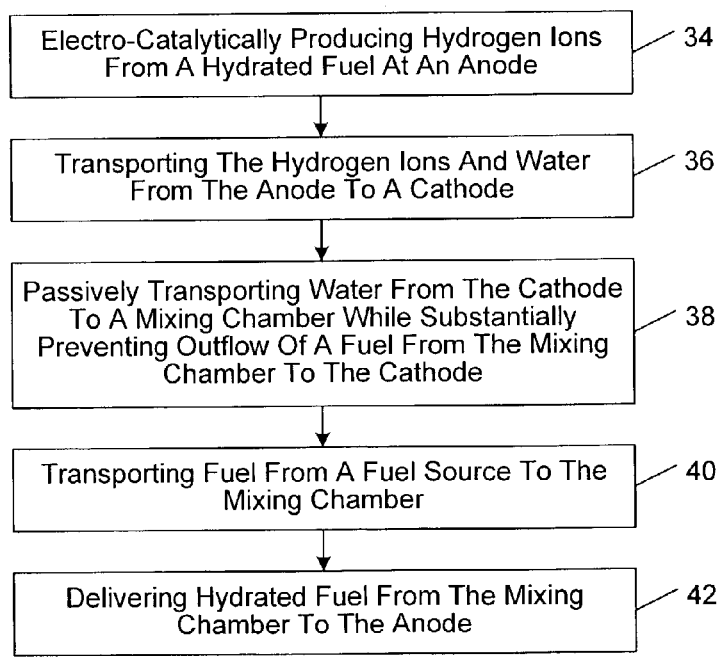
FIG. 2 is a flow diagram of a fuel cell method.

Referring to FIG. 2, when fuel cell system 10 is connected to a load, fuel cell system 10 operates as follows. At the anode side 16 of fuel cell stack 12, hydrogen ions are produced electro-catalytically from the hydrated fuel received from mixing chamber 24 (step 34). The hydrogen ions and water molecules are transported through one or more ion exchange membranes from the anode side 16 to the cathode side 20 of fuel cell stack 12 (step 36). Water recovery mechanism 22 recovers water from the cathode side 20 of fuel cell stack 12 and discharges gaseous reaction products generated at the cathode side 20 of fuel cell stack 12. Water that is recovered by water recovery mechanism 22 is passively transported through selectively permeable membrane 30 to mixing chamber 24 (step 38). At the same time, fuel is passively transported through selectively permeable membrane 32 from fuel source 14 to mixing chamber 24 (step 40). In general, the osmotic force driving the transport of water and fuel through membranes 30, 32 is the chemical potential (or molar Gibbs free energy) of mixing between the water and fuel. The hydrated fuel is delivered from mixing chamber 24 to the anode side 16 of fuel cell stack 12 (step 42). Fuel recovery mechanism 29 recovers hydrated fuel discharged from anode side 16 of fuel cell stack 12 and discharges gaseous reaction products generated at the anode side 16 of fuel cell stack 12.

Other embodiments are within the scope of the claims.

Figure 3:
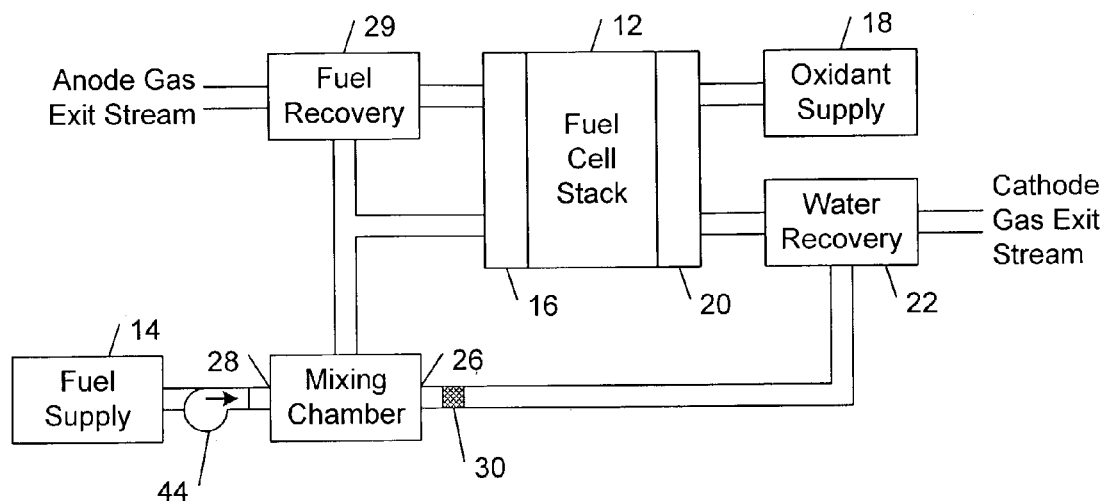
FIG. 3 is a block diagram of a fuel cell system with a pump coupled between a fuel source and a mixing chamber and a selectively permeable membrane coupled between the mixing chamber and a water recovery mechanism.
Figure 4:
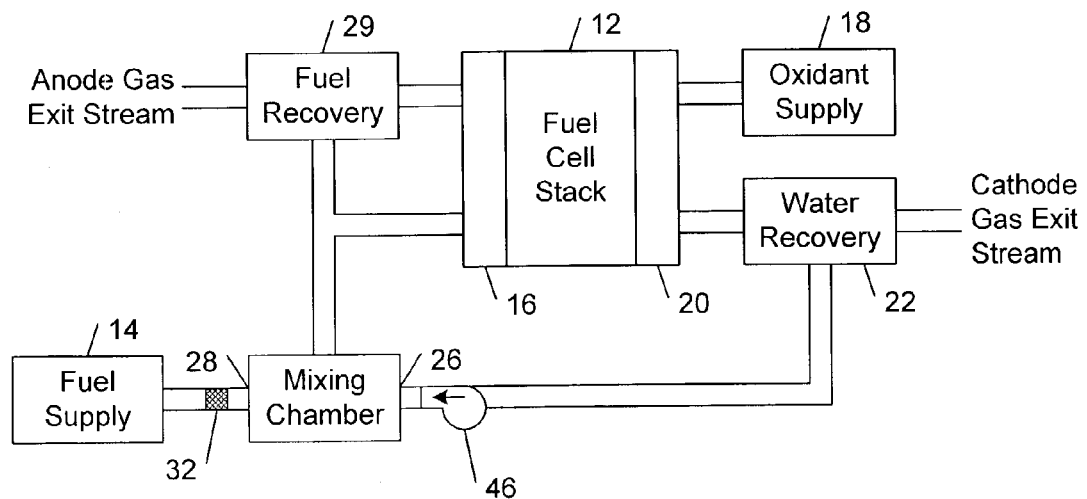
FIG. 4 is a block diagram of a fuel cell system with a pump coupled between a mixing chamber and a water recovery mechanism and a selectively permeable membrane coupled between the mixing chamber and a fuel source.

For example, referring to FIGS. 3 and 4, in some embodiments, either the fuel-side selectively permeable membrane 32 or the water-recycle-side selectively permeable membrane 30 may be replaced by a respective unidirectional pump 44, 46 (e.g., a microelectromechanical system (MEMs) based pump) or unidirectional valve.

What is claimed is:

1. A fuel cell system, comprising:
   a fuel cell having an anode side and a cathode side; and
   a mixing chamber having a recycled water input port coupled to the cathode side of the fuel cell, a fuel input port, and a hydrated fuel output port coupled to the anode side of the fuel cell, wherein a selectively permeable membrane is disposed upstream of an input port of the mixing chamber and is operable to selectively permit osmotic inflow of a first mixing component into the mixing chamber and to substantially prevent outflow of a second mixing component from the mixing chamber.

2. The system of claim 1, wherein the selectively permeable membrane is disposed upstream of the recycled water input port and is permeable to water and substantially impermeable to fuel received at the fuel input port.

3. The system of claim 2, wherein the selectively permeable membrane is hydrophilic.

4. The system of claim 2, wherein the selectively permeable membrane comprises mordenite.

5. The system of claim 2, wherein the selectively permeable membrane comprises cellophane.

6. The system of claim 2, wherein the selectively permeable membrane is a perfluorosulfonic acid membrane.

7. The system of claim 2, further comprising a second selectively permeable membrane disposed upstream of the fuel input port and being permeable to fuel and substantially impermeable to water.

8. The system of claim 1, wherein the selectively permeable membrane is disposed upstream of the fuel input port and is permeable to fuel and substantially impermeable to water.

9. The system of claim 8, wherein the selectively permeable membrane is hydrophobic.

10. The system of claim 8, wherein the selectively permeable membrane is formed from one or more material selected from the group consisting of: polyolefin, polypropylene, bis-1,4-polybutadiene, natural rubber, cross-linked polybutadiene, cis-polyisoprene, polysilicone(dimethyl silicone), copolymers of silicone, and silicone carbonates, cellulose-tridecanoate, and rubbery polymers.

11. The system of claim 1, further comprising a water recovery mechanism coupled to the cathode side of the fuel cell.

12. The system of claim 1, further comprising a fuel recovery mechanism coupled between the anode side of the fuel cell and the hydrated fuel output port of the mixing chamber.

13. The system of claim 1, wherein the fuel input port is coupled to a source of liquid fuel.

14. The system of claim 1, wherein the fuel input port is coupled to a source of gaseous fuel.

15. The system of claim 1, wherein the fuel cell is a direct alcohol fuel cell and the fuel input port is coupled to a source of an alcohol fuel.

16. A fuel cell system, comprising:
   a direct alcohol fuel cell having an anode side and a cathode side; and
   a mixing chamber having a recycled water input port coupled to the cathode side of the fuel cell, a fuel input port, and a hydrated fuel output port coupled to the anode side of the fuel cell, wherein a first selectively permeable membrane is disposed upstream of the recycled water input port and is permeable to water and substantially impermeable to an alcohol fuel received at the fuel input port, and a second selectively permeable membrane disposed at the fuel input port and being permeable to the alcohol fuel and substantially impermeable to water.

* * * * *